United States Patent [19]

Oshikoshi et al.

[11] Patent Number: 4,695,143
[45] Date of Patent: Sep. 22, 1987

[54] INSTANT PHOTOGRAPHIC APPARATUS

[75] Inventors: Yuji Oshikoshi, Tokyo; Masashi Kato; Hisashi Kikuchi, both of Kanagawa, all of Japan

[73] Assignee: Fuji Photo Film Co., Ltd., Kanagawa, Japan

[21] Appl. No.: 823,279

[22] Filed: Jan. 28, 1986

[30] Foreign Application Priority Data

| Jan. 28, 1985 | [JP] | Japan | 60-12676 |
| Jan. 28, 1985 | [JP] | Japan | 60-12677 |
| Jan. 28, 1985 | [JP] | Japan | 60-12678 |

[51] Int. Cl.$^4$ .............................................. G03B 17/50
[52] U.S. Cl. ........................................................ 354/86
[58] Field of Search ........................... 355/27, 28, 29; 354/83-86

[56] References Cited

U.S. PATENT DOCUMENTS

| 3,382,783 | 5/1968 | Chen ................................ 354/86 X |
| 4,162,834 | 7/1979 | MacLean ............................. 354/86 |
| 4,266,866 | 5/1981 | Dodge et al. ......................... 354/84 |
| 4,270,853 | 6/1981 | Hatada et al. ....................... 354/86 |

FOREIGN PATENT DOCUMENTS 686673 1/1953 United Kingdom .................. 354/85

Primary Examiner—Donald A. Griffin
Attorney, Agent, or Firm—Young & Thompson

[57] ABSTRACT

An instant photographic apparatus uses a photosensitive member, an image-receiving member, and an aqueous alkaline processing liquid separately accommodated within the housing thereof. The photosensitive and image-receiving members are, after the former has been exposed in order to create a latent image thereon, separately advanced to a position where the leading end of the exposed photosensitive member is superposed on a part of the image-receiving member. In this position, a processing liquid or rupturable pods of processing liquid is applied between the superposed members. When the superposed members are brought into contact with each other by passing between a pair of pressure-applying rollers, the processing liquid directly applied or released from the ruptured pods is distributed and spread in a uniform layer therebetween.

17 Claims, 15 Drawing Figures

INSTANT PHOTOGRAPHIC APPARATUS

BACKGROUND OF THE INVENTION

The present invention relates to an instant photographic apparatus which uses a peel-apart type instant film comprising separate photosensitive and image-receiving members which are peeled apart from each other after diffusion transfer processing. The instant photographic apparatus according to the present invention can be advantageously applicable to photographic apparatus for commercial use, such as coin-operated photographic apparatus for identification photos, drivers license photos and the like, studio photographic apparatus and image recording apparatus in OA machines such as analogue or digital copying machines, CRT display photographic devices, LCD display photographic devices and the like, such apparatus consuming a large number of instant films.

Instant photographic apparatus for use with a peel-apart type instant film unit (which is hereinafter referred to as a film unit) are well known in the art of instant photography. The film unit comprises a sheet-like photosensitive member for forming a latent image thereon, a sheetlike image-receiving member for forming a reversed visible image corresponding to the latent image formed on the photosensitive sheet by diffusion transfer processing, and a pod containing an aqueous alkaline processing liquid attached to the image-receiving member. After exposing the film unit, the separate photosensitive and image-receiving members are superposed on each other and then passed between a pair of pressure-applying rollers in superposed relation. When being passed between the pressure-applying rollers, the pressure-applying rollers apply pressure to the pod containing the processing liquid to rupture it so as to release and distribute it between the superposed photosensitive and image-receiving members.

During the processing, negative and positive images are produced corresponding to the latent image previously formed on the photosensitive and image-receiving members simultaneously by means of diffusion transfer.

The film unit used heretofore has serious problems owing to the pod which is previously attached to the image-receiving member. One of the problems is the shelf life of the film unit. In general, the photosensitive and image-receiving members have a relatively long shelf life during which they are effective without any deterioration in quality. By contrast, the processing liquid, which is a strong aqueous alkaline solution, is liable to be oxidized by reacting with acids in the air permeating the pod, thereby becoming ineffective in a relatively short time. Consequently, the shelf life of the film unit depends on that of the processing liquid used therewith. The film unit, although there is no qualitative deterioration in the photosensitive and image-receiving members, becomes unusable when the shelf life of the processing liquid has expired. Thus, in the event of the expiration of the shelf life of the processing liquid, the film unit must generally be discarded. This of course is wasteful.

Another problem is the inconvenience of handling the image-receiving member.

In order to solve these problems, the present inventors have previously proposed an instant photographic apparatus in which the photosensitive and image-receiving members are loaded separately, and after exposing, superposed on each other to provide a film unit. This apparatus is suitable for use when a large number of photos are taken, especially successively. The apparatus is described in U.S. patent application, Ser. No. 808,277, filed Dec. 12, 1985. The instant photographic apparatus described in the above-mentioned application is adapted to use an image-receiving member provided with a plurality of easily rupturable or weak pods of aqueous alkaline processing liquid attached thereto. The provision of the easily rupturable pods poses a serious problem that the pods will sometimes be accidentally ruptured either when a large number of image-receiving members in the form of a sheet of a single frame are stacked or when a long web-like image-receiving member including a large number of frames at regular intervals is rolled up tightly or in a great number of convolutions. If that happens, the whole image-receiving member or members is spoiled by the processing liquid released from the ruptured pods.

In addition, because the pod containing a processing liquid is bulky relative to the image-receiving member, it is difficult to stack the sheet-like image-receiving members flat or to roll up the web-like image-receiving member in even convolutions, resulting in the inconvenience of handling such image-receiving members and in the need to improve the image-receiving member supplying device.

OBJECTS OF THE INVENTION

It is therefore a principal object of the present invention to provide an instant photographic apparatus in which the control of the expiration date of a processing liquid is easily effected.

It is another object of the present invention to provide an instant photographic apparatus in which the control of the expiration date of a processing liquid, a photographic member, and an image-receiving member is easily effected independently of each other, thereby allowing the effective use of each member.

It is still another object of the present invention to provide an instant photographic apparatus in which a processing liquid, a photosensitive member and an image-receiving member are loaded separately from one another and put together immediately before processing.

It is a further object of the present invention to provide an instant photographic apparatus in which an image-receiving member can be easily handled.

SUMMARY OF THE INVENTION

To achieve the above-mentioned objects, the instant photographic apparatus in accordance with the present invention is adapted to supply an aqueous alkaline processing liquid in a rupturable pod or directly between an exposed photosensitive member and an image-receiving member just before processing.

The photosensitive and image-receiving members used in the instant photographic apparatus can take the form of either rolls or sheets. For feeding these members, it is desirable to use the members in the form of rolls. In this case, a portion of each member is cut off from the rolled member so as to form a single frame of film unit. The pod of processing liquid is either put between the two members or secured to the image-receiving member so as not to slip off therefrom upon being nipped between a pair of pressure-applying rollers.

In the instant photographic apparatus of the present invention, the shelf life of each image-forming element, namely, the photosensitive member, the image-receiving member and the processing liquid, can be controlled independently of each other. This permits discarding only the element whose shelf life has expired. In other words, it is not necessary to discard entire film units owing to the expiration of the shelf life of the processing liquid. Specifically, it is important to pay greater attention to the shelf life of the processing liquid, because it is the element that most quickly suffers a decrease in its quality; and so the instant photographic apparatus according to the present invention allows discarding only the deteriorated processing liquid, thereby enabling the use of a fresh processing liquid so as to provide a high quality image on an image-receiving member.

In addition, when the image-receiving members are separated from the photosensitive members and the processing liquid, they can be either stacked higher if in the form of sheets, or rolled up in a larger number of convolutions in the form of a roll, than if all three were initially together. This results in a reduction in the frequency of loading the image-receiving members into the apparatus and an easy handling.

BRIEF DESCRIPTION OF THE DRAWINGS

The above and other objects and features of the present invention will become more apparent to those skilled in the art from the following detailed description with reference to the accompanying drawings, in which.

DETAILED DESCRIPTION OF THE INVENTION

Figure 1:
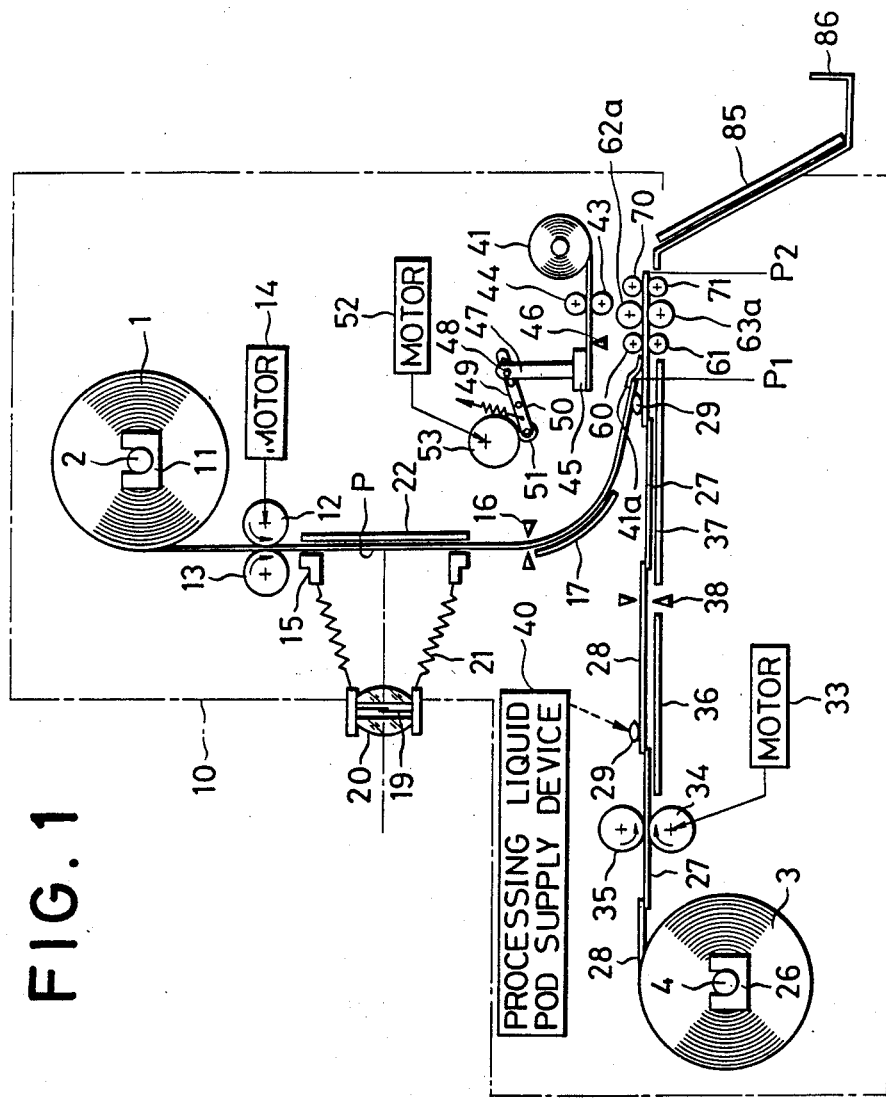
FIG. 1 is a schematic sectional view of an embodiment of the instant photographic apparatus according to the invention in which pods of processing liquid are placed on an image-receiving member.

Referring now to FIG. 1, shown therein is an instant photographic apparatus according to an embodiment of the present invention which is adapted to supply pods containing an aqueous alkaline processing liquid therein immediately before processing. In a housing 10 at its upper section, a holder 11 detachably mounts a core rod 2 on which a web-like photosensitive member 1 is rolled. Within the housing 10, there is an exposure frame 15 at an exposure position P in front of which a taking lens 20 with a between-the-lens shutter 19 is fixed so as to create a latent image on the photosensitive member 1 in the exposure position P during exposure. Behind the exposure frame 15, there is a flat plate 22, which is a pressure plate, for maintaining the advanced portion of the photosensitive member 1 flat thereon. Between the taking lens 20 and the exposure frame 15 a bellows 21 is provided to exclude undesired ambient light.

Above the exposure frame 15 there is a pair of rotatable rollers 12, 13, one 12 of which is driven by means of a motor 14 to advance the photosensitive member 1 to the exposure position P for exposure. After exposure, the rollers 12, 13 also advance the photosensitive member 1 by a predetermined length until the leading end of the photosensitive member 1 reaches a first position P1 where the exposed photosensitive member is superposed on an image-receiving member which will be described later. For changing the direction of the photosensitive member 1 there is provided a guide plate 17. When the leading end of the photosensitive member 1 reaches the first position P1, the photosensitive member 1 is cut off by means of a cutter 16 to form a frame of photosensitive sheet member 1a.

In the lower section of the housing 10 there is a holder 26 for detachably mounting a core rod 4 on which a web-like image-receiving member 3 is rolled. As will be described later, the image-receiving member 3, after having been superposed on the exposed photosensitive member 1, is formed with a visible positive image corresponding to the latent image on the photosensitive member 1 by means of diffusion transfer processing which is well known in the art of instant photography.

Figure 2:
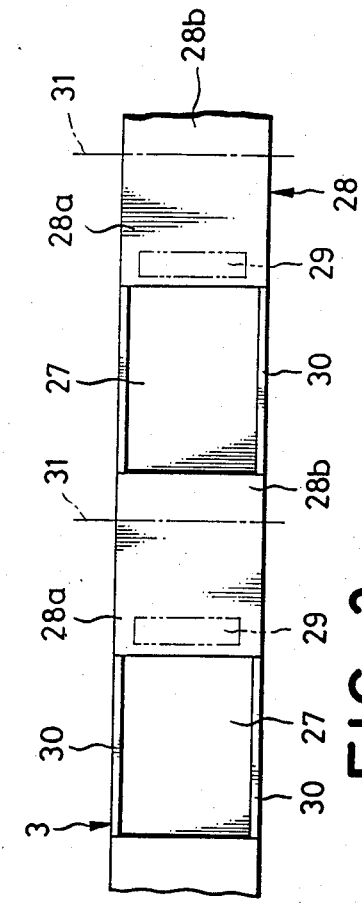
FIG. 2 is a plan view of the image-receiving member of FIG. 1.

The image-receiving member 3, as shown in FIG. 2, comprises a plurality of image-receiving and coupling sheets 27, 28 which are connected to one another in an alternate arrangement. Attached to the coupling sheet 28 is, as shown by a double dotted line, a pod 29 of processing liquid, which will be described in detail later. Along the side margins of the image-receiving sheet 27, longitudinal spacer members 30, 30 are connected to the image-receiving sheet 27 so as to provide a certain clearance between the image-receiving sheet 27 and exposed photosensitive member 1 when superposed on each other in order to spread a processing liquid from the ruptured pod 29 in a uniform layer.

The image-receiving member 3 in the form of a roll loaded in the instant photographic apparatus is withdrawn frame by frame to be cut along the phantom dotted line 31 to a sheet-like member, whereby the coupling sheet 28 is divided into two parts, namely, a withdrawing section 28a and a skirt or trailing section which in turn serves as trap means for the excess processing liquid.

The structures and compositions of the emulsion layers of the photosensitive member 1 and image-receiving sheet 27 as well as the emulsion itself, the aqueous alkaline processing liquid and the pod 29 for the same, which may all be similar to or the same as in various kinds of instant films now on the market in Japan and the United States of America, are irrelevant to the present invention; and a detailed description thereof is accordingly omitted.

Also in the lower section of the housing 10 there is a pair of rotatable rollers 34, 35, one of which is driven by means of a motor 33 to withdraw the image-receiving member 3. The rollers 34, 35 also advance via guide members 36, 37 the image-receiving member 3 by a predetermined length until the leading end of the image-receiving member 3 reaches a second position P2 where the image-receiving member 3 is superposed on the photosensitive member 1. As shown in FIG. 1, the second position P2 is beyond the first position P1 relative to the front side of the housing 10. The image-receiving member 3 thus withdrawn and advanced is cut off along the phantom line 31 by means of a cutter 38 to form a frame of image-receiving sheet member 3a.

Between the advancing rollers 34, 35 and cutter 38 there is a pod supply device 40 which contains a large number of pods 29 therein and is adapted to put pods on the image-receiving member 3 one by one before the image-receiving member 3 is superposed on the exposed photosensitive member 1. Upon putting the pod 29 on the image-receiving member 3, it is desirable to secure the pod 29 thereto by using adhesive materials, for example a piece of adhesive tape, an adhesive agent or the like in order to avoid the undesirable dislocation and/or rupture of the pod 29. The application of the adhesive material can be effected in any way. For example, the adhesive material may be applied to either the pods 29 or the image-receiving member 3, and is also applicable thereto either prior to or at the time when the pods 29 are placed on the image-receiving member 3. When previously applying the adhesive material to the pods 29 or the image-receiving member 3, it is desirable to use one whose adhesive property is developed only by means of heating, adding water or the like.

When the exposed photosensitive member 1 is superposed on the image-receiving member 3 with the pod 29 of processing liquid between them, a piece of adhesive tape 41a is used to securely combine them with each other. The use of a piece of adhesive tape 41a has the purpose of eliminating relative movement of slippage between the superposed sheet members 1a, 3a when pulling the superposed sheet members 1a, 3a between a pair of pressure-applying rollers for processing so as to produce an image without any blurring or poor registry on the image-receiving sheet member 3a.

The adhesive tape piece 41a is provided in such a way that the foremost end of a roll of adhesive tape 41 is withdrawn and then cut off to a certain length. Specifically, a certain length of adhesive tape 41 is withdrawn by means of a pair of feed rollers or toothed rollers 43, 44, and is held by means of a push plate 45 by suction, the push plate 45 being connected to a sliding rod 47 for vertical movement. Therefore, the part of the adhesive tape 41 held by the push plate 45 can be cut off by means of a cutter 46 upon downward movement of the sliding rod 47. The adhesive tape piece 41a thus cut off is pressed against the superposed photosensitive and image-receiving members 2, 3 to connect them to each other. After this, the push plate 45 releases the adhesive tape piece 41a and returns upwardly. The adhesive tape 41, although shown as being withdrawn in a direction parallel to but opposite from the movement of the image-receiving member 3, may instead be withdrawn in a direction perpendicular to the movement of the image-receiving member 3. Such a modification can be easily carried out by changing the location of the roll of adhesive tape 41. It may be also desirable to use a heat sealer for connecting the forward end of the photosensitive member 1 to a part of the image-receiving member 3. In this case, the withdrawing section 28a of the image-receiving member 3 has a bonding agent layer which has been previously provided thereon. On the bonding agent layer, the forward end of the exposed photosensitive member 1 is superposed and then pressed by means of the heat sealer.

The sliding lever 47 to whose lower end the push plate 45 is connected, is slidably supported by guide members (not shown) for vertical movement. For causing the vertical movement of the sliding level 47, there is provided an eccentric cam member 53 the periphery of which is in contact with a contact roller 51 on one end of a rocking lever 49 pivotally mounted on a shaft 50 at its midportion. The sliding lever 47 at its upper end is coupled to the opposite end of the rocking lever 49 by means of a pin 48. Therefore, the sliding lever performs a vertical movement between its upper and lower positions at every turn of the cam member 53 which is rotated by a motor 52.

Figure 3:
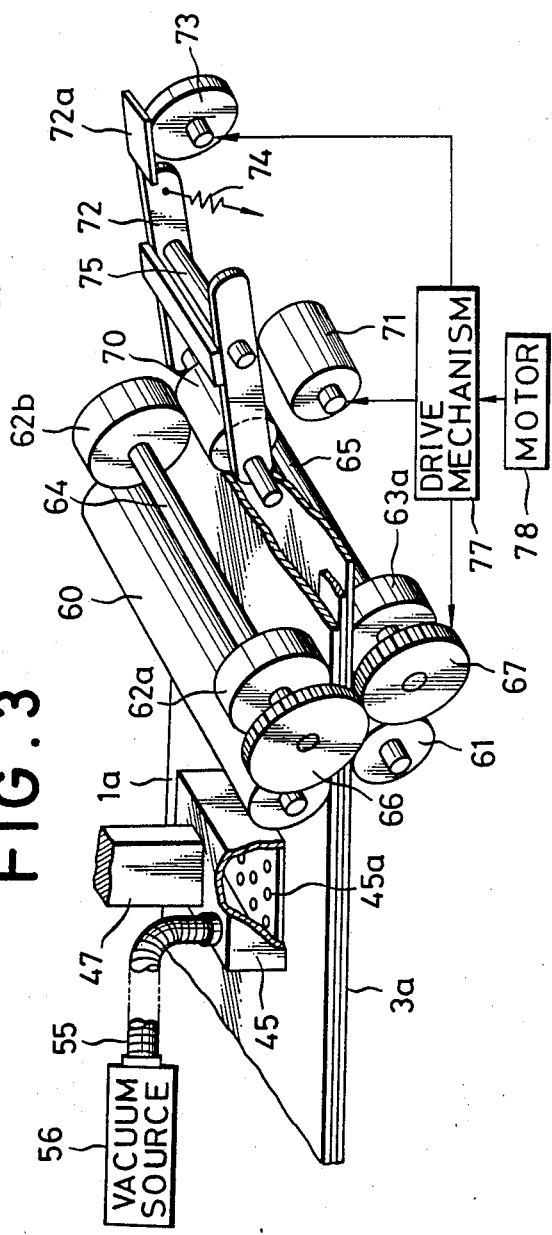
FIG. 3 is a perspective view showing a withdrawal mechanism.

Reference is now had to FIG. 3, in which it will be seen that the push plate 45, which forms the bottom of a suction box, is formed with a number of suction holes 45a. The suction box is connected to a vacuum source 56 through a flexible pipe 55 for producing a negative pressure in the suction box.

Downstream of the suction means provided by the push plate 45, there is disposed a pair of pressure applying rollers 60, 61 biased toward each other between which the superposed photosensitive and image-receiving sheet members 1a, 3a in close contact are pulled to rupture the pods 29.

Downstream of the pressure-applying rollers 60, 61 is a pair of disk-like transporting rollers 62a, 62b fixedly supported on the ends of a shaft 64 and a pair of disk-like transporting rollers 63a, 63b (the roller 63b is out of sight in FIG. 3) supported on the ends of a shaft 65 juxtaposed to the transporting rollers 62a, 62b. These disk-like transporting rollers 62a, 62b and 63a, 63b, which are rotated at the same rate through gears 66, 67 engaging with each other, transport the superposed sheet members 1a, 3a by gripping longitudinal spacer members 30, 30 therebetween in order to prevent marking. The rotation of the gear 67 is caused by a motor 78 through a drive mechanism 77.

Because high pressure is applied to the superposed sheet members 1a, 3a to rupture the pod 29 by means of the pressure applying rollers 60, 61, the superposed sheet members 1a, 3a must be withdrawn with considerable tensile force. Thereupon, the superposed sheet members 1a, 3a are apt to slip between the disk-like transporting rollers 62a, 63a and 62b, 63b. To avoid such slippage, there is provided a pair of withdrawing rollers 70, 71 downstream of the transporting rollers 62a, 62b and 63a, 63b so as to seize the forward end of the image-receiving sheet member 3a at the beginning of the withdrawal and then to withdraw the same to a certain extent. If the withdrawing rollers 70, 71 are in contact with the superposed sheet members 1a, 3a until after the pod has passed between the pressure-applying rollers 60, 61, there will be produced marks on the image-receiving sheet 27. For this reason, the withdrawing roller 70 is adapted to be disengaged from the image-receiving sheet member 3a before the image-receiving sheet 27 arrives. This disengagement of the withdrawing roller 70 is effected by means of a rocking arm 72 on one end of which the withdrawing roller 70 is rotatably mounted. The rocking arm 72 is rotated counterclockwise about an axis 75 when the end portion 72a is pushed up against a spring 74 by means of an eccentric cam member 73.

The foregoing transporting rollers 62a, 62b, 63a and 63b, withdrawing roller 71 and the cam member 73 are connected to and driven by the motor 78 through the drive mechanism 77 as shown in block diagram form in FIG. 3. the motors 14, 33, 52 and 78, shutter 16, pod supply device 40 and the like are sequentially caused to operate under the control of a micro-computer built in the apparatus, upon operating the start key.

The sequential operation of the instant photographic apparatus described hereinbefore and according to this embodiment of the present invention will be now described hereinunder.

After having loaded the web-like photosensitive member 1 rolled on the core rod 2 by mounting the same on the holder 11, the photosensitive member 1 is withdrawn to position the leading end of the photosensitive member 1 at the position of the cutter 16. On the other hand, after having loaded the web-like image-receiving member 3 rolled on the core rod 4 by mounting the same on the holder 26, the leading end thereof is withdrawn and positioned at the cutter 38.

For taking the picture of a subject in front of the taking lens 20, a start button (not shown) is depressed to cause the shutter 19 to open so as to create a latent image of the object on the forepart of the photosensitive member 1 in the exposure position P. After the operation of the shutter 19 has ended, the pod supply device 40 is automatically actuated and places and secures a pod 29 of aqueous alkaline processing liquid on the withdrawing section 28a of the coupling sheet 28. The motor 33 is then started to rotate, causing the rotation of the advancing rollers 34, 35 between which the image-receiving member 3 is nipped, so that image-receiving member 3 is advanced along the guide plates 36, 37 toward the second position P2. When the leading end of the image-receiving member 3 is detected by means of, for example, a well-known photosensor at the second position P2, the motor 33 is stopped. During the advance of the image-receiving member 3, the motor 78 starts to rotate to cause the rotation of the rollers 70, 71, so as to advance the image-receiving member 3 until the pod 29 passes between the pressure-applying rollers 60, 61. Following the passage of the pod 29 between the pressure-applying rollers 60, 61, the motor 78 is stopped.

On the other hand when the leading end of the image-receiving member 3 reaches the second position P2, the motor 14 is started to rotate, causing the rotation of the advancing rollers 12, 13, thereby to advance the photosentivie member 1 by a predetermined length. The forward part of the photosensitive member 1 is, after being guided by a curved guide plate 17, moved onto and along the upper surface of the image-receiving member 3. The motor 14 is also stopped when the leading end of the photosensitive member 1 is detected by means of, for example, a well-known photosensor at the first position P1.

When the forward part of the photosensitive member 1 is superposed properly on the image-receiving member 3, the rollers 43, 44 are caused to rotate so as to feed a certain length of the adhesive tape 41, which in turn is held by the push plate 45 by suction. Then the motor 52 is started to rotate so as to effect one revolution of the eccentric cam member 53, causing the sliding lever 47 to perform one reciprocating motion. During the down movement of the sliding lever 47, the adhesive tape 42 held by the push plate 45 is cut off by the cutter 46 to provide an adhesive tape piece 41a of a certain length. At its lowermost position, the sliding lever 47 and hence the push plate 45 force the adhesive tape piece 41a against the end of the photosensitive member 1 and a part of the image-receiving member 3, thereby connecting these members 1, 3 to each other.

Immediately after the connection of the two superposed members 1, 3 by the adhesive tape piece 41a, a valve (not shown) of the vacuum source 56 is changed over to place the inside of the holding box including the push plate 45 in communication with the atmosphere, thus releasing the adhesive tape piece 41a. After this, the sliding lever 47 retracts upwardly to its initial position. The superposed and connected photosensitive and image-receiving members 1, 3 confine pod 29 therebetween.

Figure 4:
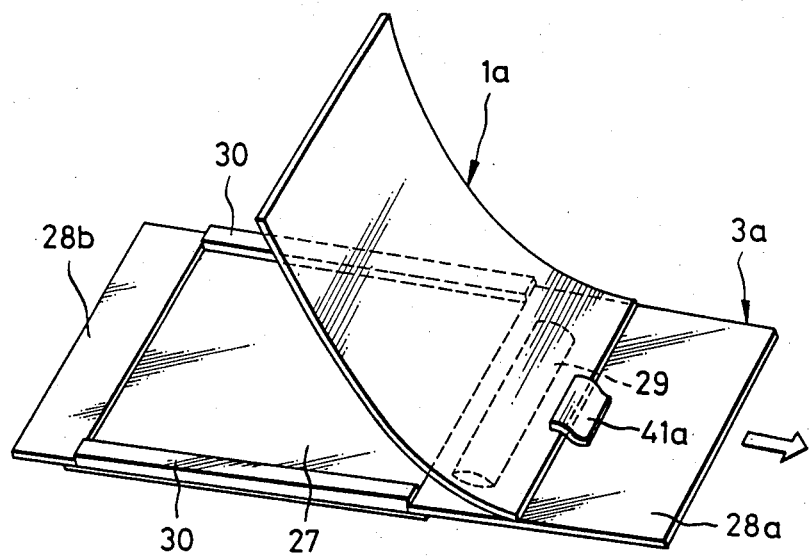
FIG. 4 is a perspective view of the photosensitive and image-receiving members partly superposed on each other.

Successively, the cutters 16 and 38 are actuated to cut the superposed photosensitive and image-receiving members 1, 3, respectively so as to form a photosensitive sheet member 1a and an image-receiving sheet member 3a as shown in FIG. 4. After having formed the sheet members 1a, 3a, the motor 78 is restarted to rotate, causing the rotation of the nip rollers 70, 71 so as to withdraw the image-receiving sheet members 3a. Concurrently, the side rollers 62a, 62b and 63a, 63b, which nip the longitudinal sides of the superposed sheet members 1a, 3a, withdraw the superposed sheet members 1a, 3a as a sheet unit. During the withdrawal, the pod 29 of processing liquid is ruptured by means of the pressure-applying rollers 60, 61 to release the processing liquid therefrom which in turn is distributed between the superposed sheet members 1a, 3a. As the superposed sheet members 1a, 3a of a sheet unit are transported passing between the pressure-applying rollers 60, 61, the processing liquid is spread in a uniform layer therebetween. The excess processing liquid is trapped between the trailing end portion of the photosensitive sheet member 1a and the trapping section 28b provided at the end of the image-receiving sheet member 3a.

After the pod 29 has been ruptured, the cam member 73 is controllably rotated to swing the rocking arm 72 in the clockwise direction about the shaft 75, thereby moving and keeping the withdrawing roller 70 rotatably secured to the end of the rocking arm 72 away from the photosensitive sheet member 1a until the withdrawal of the superposed sheet members 1a, 3a is completed.

Meanwhile, the side rollers 62a, 62b and 63a, 63b are continuously rotated to withdraw the superposed sheet members 1a, 3a, thereby delivering them as an instant film unit 85 from the apparatus. The diffusion transfer processing takes place outside the apparatus in several tens of seconds, for example 60 seconds. After the lapse of this processing time period, the sheet members 1a, 3a of the film unit 85 are peeled apart from each other to provide a desired reverse image on the image-receiving sheet members 3a as an instant photo print.

Figure 5:
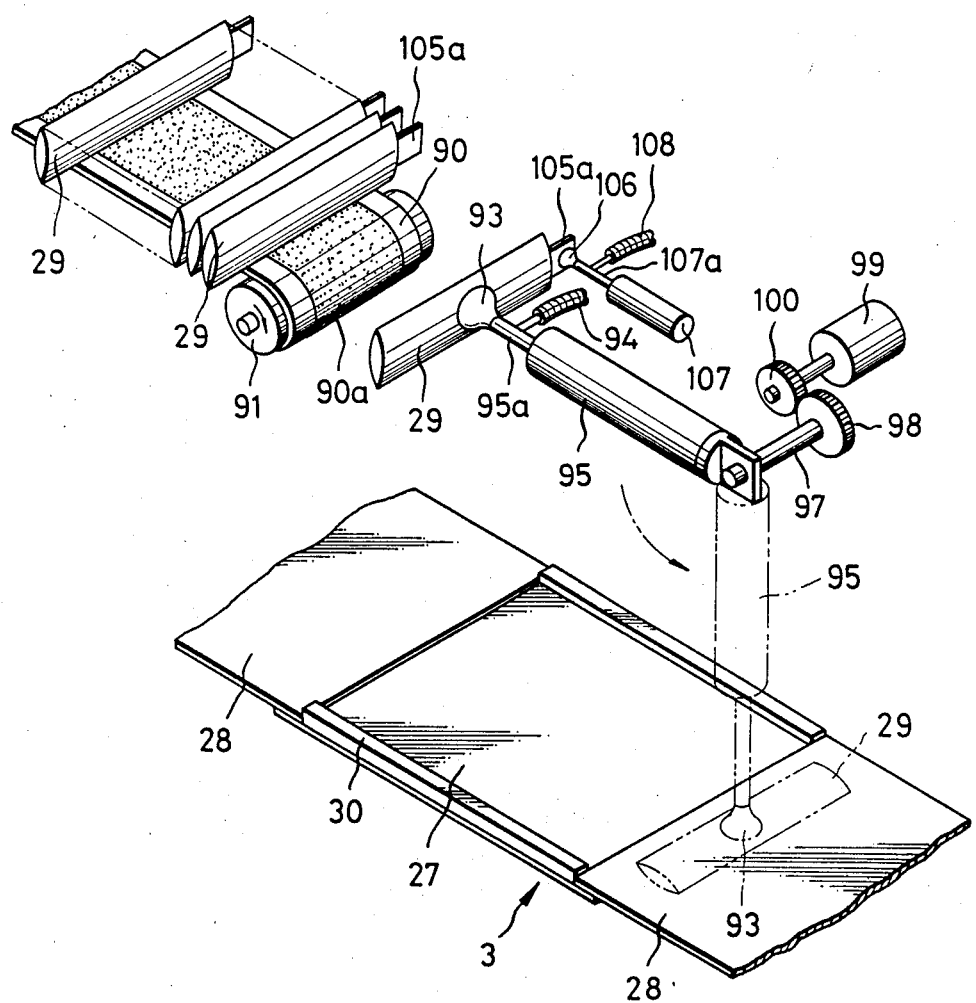
FIG. 5 is a perspective view showing a processing liquid pod supply device.

Reference is now had to FIG. 5, wherein is shown an embodiment of the pod supply device 40. This pod supply device 40 comprises a conveyor tape 90 with a thin adhesive layer 90a on which a large number of pods 29 stand transversely arranged side by side. Each pod 29 is separably held on the conveyor tape 90 by sticking to the adhesive layer 90a along its lower edge. The conveyor tape 90 at its leading end is connected to an intermittently rotatable takeup roller 91 by means of an adhesive tape piece or the like. Following the operation of the shutter 19, the take-up roller 91 rotates in the clockwise direction through a certain angle so as to place the foremost pod 29 in position.

For feeding the pods 29, there is provided means having a suction head 93 which is connected to a vacuum source (not shown) through a pipe 94 and to the end of a piston rod 95a reciprocating in a cylinder 95. The air cylinder 95 at its rear end is fixedly supported on a shaft 97 for vertical swinging movement through 90°, which is effected by means of a motor 99 through the engagement between gears 98, 100.

When the foremost pod 29 on the conveyor tape 90 is placed in position, the cylinder 95 is actuated so as to extend the piston rod 95a and, after the pod 29 is held by the suction head 93 by suction, to retract the same. After this, the motor is started to swing cylinder 95 down through 90° so as to place the pod 29 held by the suction head 93 above the coupling sheet 28 of the image-receiving member 3, as shown by a double dotted line. The air cylinder 95 is again actuated to extend the piston rod 95a farther so as to press the pod 29 against the coupling sheet 28. Then the inside of the suction head 93 is placed in communication with the atmosphere in a well known manner, thus releasing the pod 29. After this, the piston rod 95a is retracted, and the air cylinder 95 is swung back up to its initial position.

Figure 6:
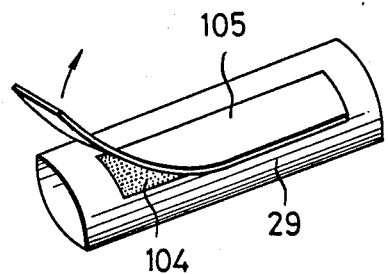
FIG. 6 is a perspective view showing a pod of processing liquid on which an adhesive layer is provided.

As shown in FIG. 6, each of the pods 29 of processing liquid at its back surface is formed with an adhesive layer 104 over which a separation sheet 105 is attached for preventing the pod 29 from sticking to an adjacent one. The separation sheet 105 has a part 105a (see FIG. 5) projecting laterally from the pod 29 which is separated before being placed on the coupling sheet 28 by means of a suction head 106 arranged parallel to the suction head 93. The suction head 106 is connected to a vacuum source (not shown) through a pipe 108 and to the end of a piston rod 107a performing reciprocating motions in a cylinder 107.

When the foremost pod 29 is removed from the conveying tape 90 by the retraction of the piston rod 95a, the suction head 106 catches and holds the projected part 105a of the separation sheet 105 by suction, then removes the same as a result of the extension of the piston rod 107a.

The pod supply device described above is controllably operated in the following way:

When the photosensitive member 1 is exposed, the take-up roller 91 is rotated through a certain angle to wind up a certain length of the conveying tape 90, so as to move the pods 29 by a certain distance. Then the air cylinder 95 is actuated to extend the piston rod 95a until the suction head 93 contacts the foremost pod 29 on the conveyor tape 90. The vacuum source is actuated, and the suction head 93 holds the pods 29 by suction. Following the retraction of the piston rod 95a, the suction head 106 holds the projected part 105a of the separation sheet 105. The air cylinder 107 is then actuated to extend the piston rod 107a, so as to remove the separation sheet 105 from the pod 29. The air cylinder 107 retracts the piston rod 107a to its initial position after the removed separation sheet 105 has been released from the suction head 106 and discharged in a waste receptable (not shown in FIG. 5).

After the removal of the separation sheet 105a, the motor 99 is started to rotate so as to turn the air cylinder 95 one-fourth revolution, placing the pod 29 above the coupling sheet 28 as shown by a double dotted line in FIG. 5. The air cylinder after this one-fourth revolution, extends the piston rod 95 again pressing and thus sticking the pod 29 against the coupling sheet 38. Finally, following the retraction of the piston rod 95a, the air cylinder 95 is turned in the clockwise direction to its initial position shown by the solid line in FIG. 5, and the sequential operation of the pod supply device comes to an end.

Figure 7:
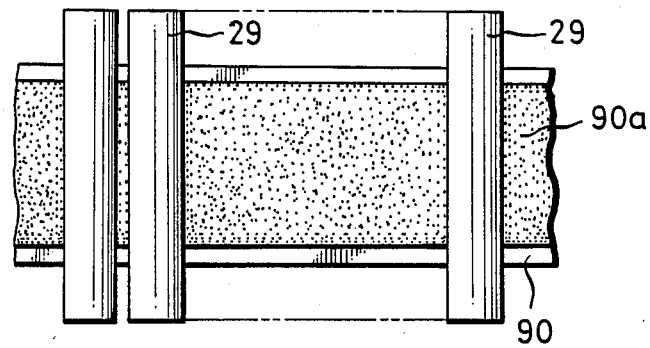
FIG. 7 is a plan view showing another type of processing liquid pod supply device.

FIG. 7 shows another way of supplying the pods 29, in which each pod 29 is transversely laid down on the conveyor tape 90 with an adhesive layer 90a in such a way that both ends of the pod 29 project beyond the conveying tape 90. In this case, the suction head 93 is vertically reciprocated for seizing and then removing the pod from the conveyor tape 90.

Figure 8:
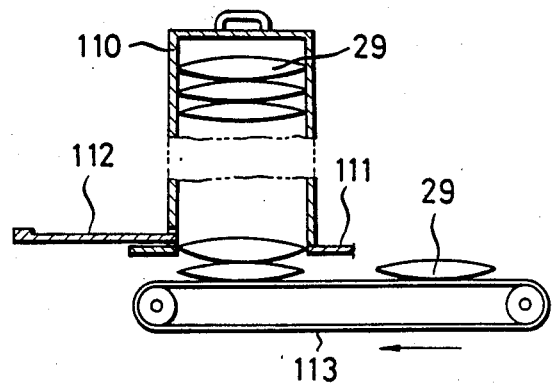
FIG. 8 is a schematic sectional view showing still another type of processing liquid pod supply device.

FIG. 8 shows still another way of supplying the pods 29 which are accommodated in a cartridge. A cartridge 110 in the form of a rectangular barrel-shaped container is provided in which a large number of pods 29 of processing liquid are stacked. After placing the cartridge 110 on a holding table 111, a bottom gate 112 is opened, and the pods 29 drop and are supported on a conveyor belt 113 suspended between a pair of rotatable rollers. Thereafter, when moving the conveyor belt 113 by rotating the rollers, the pods 29 are withdrawn from the bottom of the stack in cartridge 110 one by one. Each pod 29 thus withdrawn is picked up by the suction head and placed on the image-receiving member 3 in the same way as described above.

Figure 9:
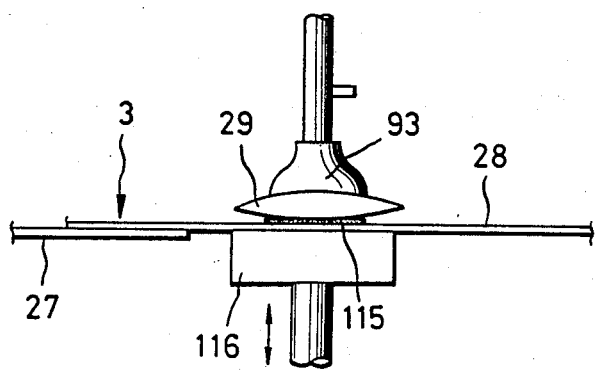
FIG. 9 is a schematic side view of a further type of processing liquid pod supply device.

FIG. 9 shows an example for attaching a pod to the image-receiving member by heat sealing. In this example, there are previously applied adhesive layers 115 on each coupling sheet 28. On the adhesive layer 115, the pod 29 is placed and then pressed by means of a heater 116 for quickly bonding the pod 29 to the coupling sheet 28. It is apparent that the adhesive layer 115 can alternatively be applied to the pod 29.

It is well known in the art of instant photography to heat the instant film unit 85 to a temperature of about 25°–30° C. for a certain time, for example approximately 60 seconds before peeling apart the sheet members 1a, 3a from each other in order to obtain a desired print with uniform quality thereover. For this reason, it is desirable to heat the instant film unit 85 for a certain time within the housing 10 before delivering the same into a tray 86.

It is also well known in the art of instant photography to provide an opaque member or material in an instant film unit in order to enable processing the exposed instant film unit in the daylight without light fog.

If an opaque member or material is omitted, the cost of the photosensitive and image-receiving members will be lowered. In this case, however, the instant film unit must be processed in a darkroom. For satisfying the above-mentioned requirements, it is desirable to provide in a housing which is adapted to exclude the ambient light, a means for temporarily retaining the instant film unit 85 within the housing.

Figure 10:
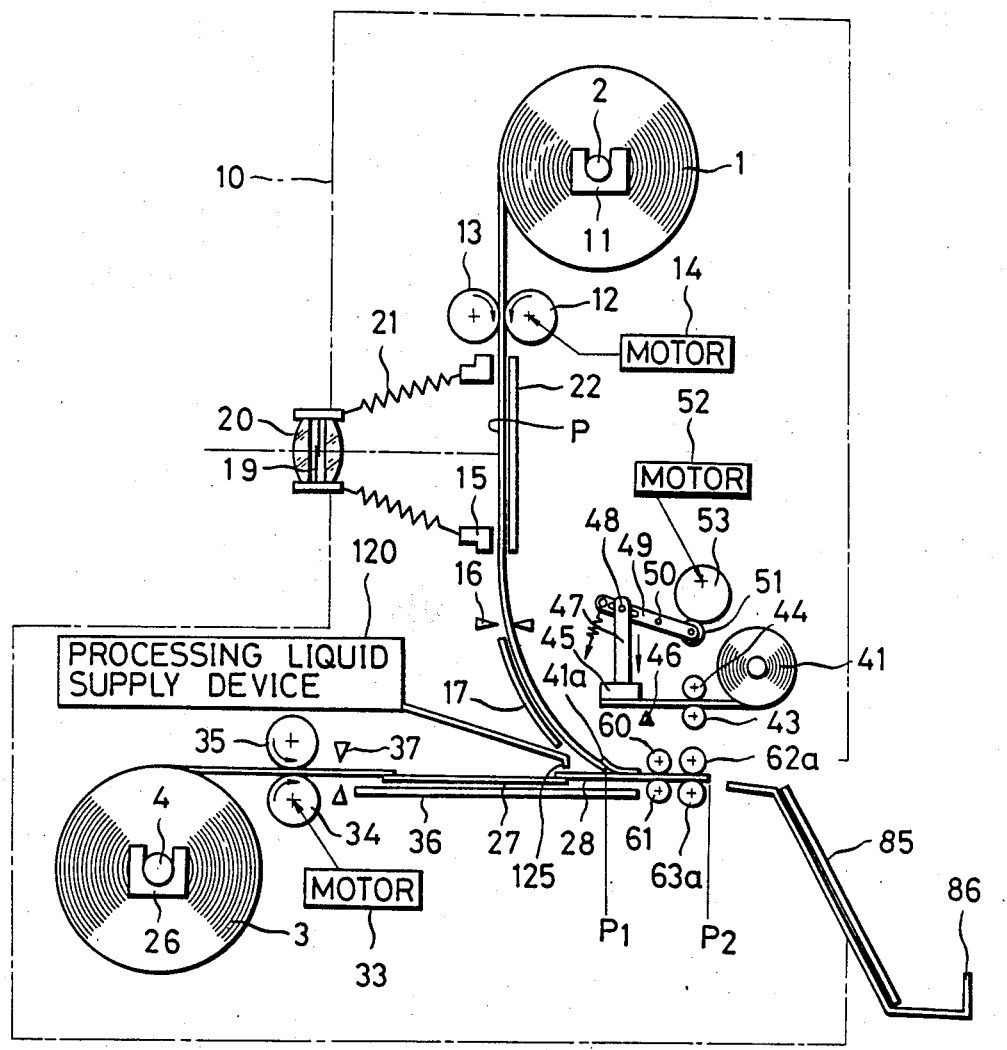
FIG. 10 is a schematic sectional view of another embodiment of the instant photographic apparatus according to the present invention in which a processing liquid is applied directly on the image-receiving member.

Reference is now had to FIG. 10, wherein is shown another embodiment of the instant photographic apparatus in accordance with the present invention, in which a processing liquid is applied directly between the photosensitive and image-receiving members. In this embodiment, the same parts as in the instant photographic apparatus shown in FIG. 1 are denoted by the same numerals.

For directly applying a processing liquid, there is provided in the housing 10 a processing liquid supply device 120 having a nozzle 125 through which a processing liquid is ejected.

At the first position P1, the photosensitive member 1 at its leading end is superposed on a part of the image-receiving member 3 in the same manner as previously described, whereby there is formed a rectangular space therebetween into which a certain quantity of aqueous alkaline processing liquid is supplied through the nozzle 125. The processing liquid thus supplied remains on the coupling sheet 28 in the vicinity of the boundary between the image-receiving and coupling sheets 27, 28. It is possible in this embodiment to apply and distribute a processing liquid to the image-receiving sheet 27 little by little while superposing the photosensitive and image-receiving members 1, 3. The direct application of processing liquid contributes to reducing the force to be applied to the superposed members for processing, allowing the omission of the nip rollers 70, 71.

Figure 11:
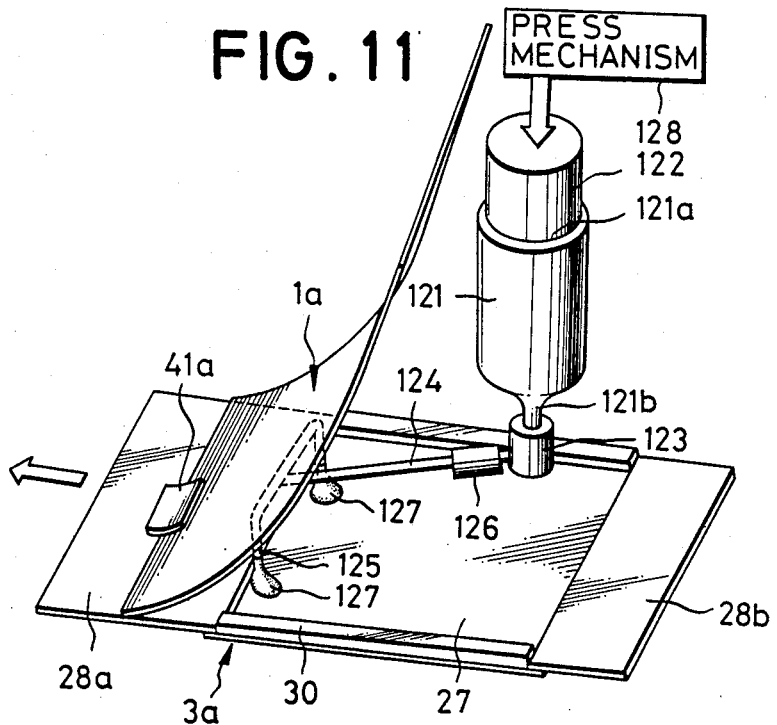
FIG. 11 is a perspective view showing a processing liquid supply device.

FIG. 11 shows an example of the processing liquid applying device, comprising a cylindrical container 121 of processing liquid. The container 121 is formed with an open end 121a into which a piston 122 is fitted and an elongated discharge pipe 121b. The opening of the discharge pipe 121b is covered with, for example, a cap for the purpose of avoiding the oxidation of the processing liquid in the container upon shipping, and when it is loaded in the photographic apparatus, is connected to a coupling member 123 fixedly supported within the housing 10 after removing the cap. Coupled to the coupling member 123 through an electromagnetic valve 16 is a pipe 124 provided with the nozzles 125, 125 at its exit end. The electromagnetic valve 126 is actuated to allow the discharge of processing liquid for a certain time upon the completion of the application of the adhesive tape piece 41a to the superposed members 1, 3, so that a certain quantity of processing liquid 127 can be discharged through the nozzles 125, 125. Although two nozzles 125, 125 are provided in this example, the number of nozzles is selected according to the quantity of processing liquid to be applied between the superposed members 1, 3.

The above-mentioned piston 122 is forced downwardly by means of a press mechanism 128 which comprises, for example, an arm movable downwardly by a predetermined distance every time so as to maintain the pressure of the processing liquid in the container 121 constant. When the electromagnetic valve 126 is opened for a predetermined time, a predetermined quantity of processing liquid 127 is forced to flow through the pipe 124 and then ejected from the nozzles 125.

Figure 12:
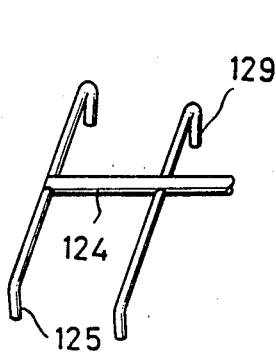
FIG. 12 is a perspective view of another type of a nozzle assembly used in the processing liquid supply device of FIG. 11.

FIG. 12 shows another example of the nozzle assembly in which there are two pairs of nozzles 125, 129 in communication with pipe 124, one pair at the end and the other pair at the middle of the pipe 124.

Figure 13:
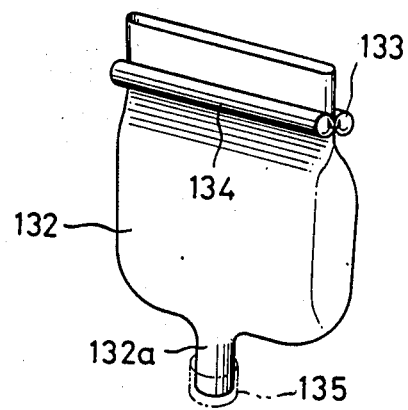
FIG. 13 is a perspective view of another type of a processing liquid container used in the processing liquid supply device of FIG. 11.

FIG. 13 shows another example of the processing liquid container, in which a container 132 is made of a flexible material such as rubber. The flexible container 132 is nipped between and squeezed by a pair of rollers 133 which is adapted to move downwardly by a certain distance every processing. The numeral 135 denotes a cap covering a discharge pipe 132a of the flexible container 132.

Figure 14:
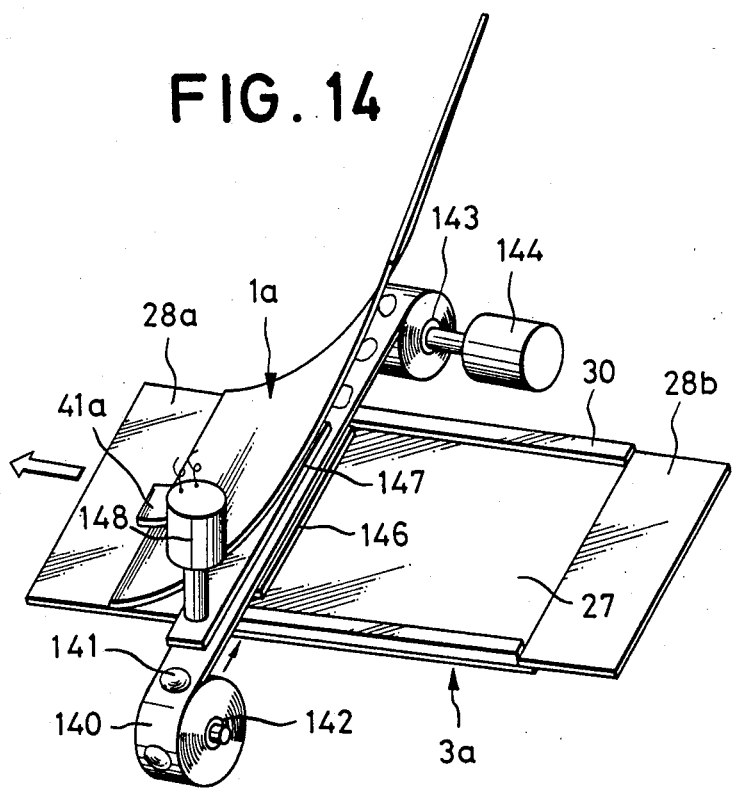
FIG. 14 is a perspective view showing another processing liquid supply device.

FIG. 14 shows still another example of the processing liquid supply device in which a processing liquid supply belt 140 formed with a large number of bladders 141 of processing liquid arranged in a row or rows at regular intervals. The processing liquid supply belt 140 rolled on a core rod 142, which extends through the rectangular space formed between the superposed photosensitive and image-receiving sheet members 1a, 3a at the first position, is wound up on a take-up roller 143 which is intermittently rotated by means of a motor 144. For the application of the processing liquid, there are provided support and press plates 146 and 147 between which the processing liquid supply belt 140 is caught and pressed, so to rupture the bladders 141. For pressing the processing liquid supply belt 140, the press plate 147 at its one end is connected to a solenoid 148, and thereby depressed when the solenoid 148 is actuated.

Figure 15:
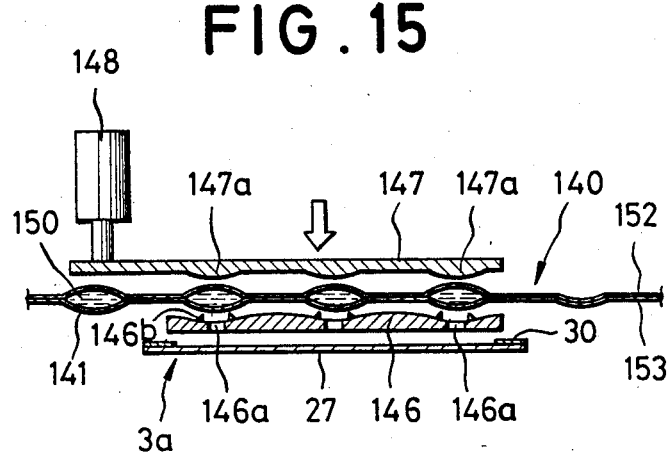
FIG. 15 is a schematic sectional view of the processing liquid supply device of FIG. 14.

As shown in detail in FIG. 15, the support plate 146 is provided with a plurality of holes 146a corresponding to the bladders 141 in the processing liquid supply belt 140 when caught between the plates 146, 147. Around each hole 146a there is defined a depression for the suitable fit of the bladder 150 therein. Adjacent each hole 146a there are also provided needles 146b which are used to break through the bladder 150.

The processing liquid supply belt 140 comprises two web-like sheet 152, 153, each being formed with a large number of depressions at regular intervals, which are superposed and bonded at parts between the depressions after the injection of a processing liquid into each bladder 141 defined by the corresponding depressions. It is desirable to use sheets 152, 153 made of impermeable, breakable sheet materials such as coated papers, plastic films, or metallic foils of, for example, aluminum or the like.

Opposite to the detents, there are formed on the press plate 147 protrusions 147a for pressing the bladders 141 against the support plate 146, and breaking the same to release the processing liquid 150 therein. The released processing liquid falls onto the image-receiving sheet members 3a through the holes 146a of the support plate 146.

The reason why the bladder 141 is broken after the application of the adhesive tape piece 41a is to minimize the oxidation of the processing liquid. If no consideration need be given to the oxidation of the processing liquid, the bladder 141 can be broken at any time after the operation of the shutter 19. In this case, the processing liquid applying device can be disposed between the advancing roller 35 and the cutter 37.

The invention has been described with particular reference to preferred illustrative embodiments thereof, but it will be understood that various variations and modifications can be effected within the spirit and scope of the invention.

What is claimed is:

1. An instant photographic apparatus for use with a photosensitive member and an image-receiving member, comprising:

means for exposing said photosensitive member in order to create a latent image thereon;

means for separately advancing said exposed photosensitive member to a position superposed on an image-receiving member;

means for separately advancing said image-receiving member to said superposed position;

means for supplying a processing liquid to said image-receiving member, comprising a processing liquid supply belt formed with a large number of bladders of the processing liquid at regular intervals, means for stepwise advancing said processing liquid supply belt transversely to the direction of movement of said photosensitive and image-receiving members at said superposed position, and means for breaking said bladders while said belt is resting; and means for pressing said exposed photosensitive and processing liquid supplied image-receiving members into close contact with each other and for distributing the processing liquid between said members.

2. An apparatus as defined in claim 1, wherein said photosensitive member is in the form of a roll, and means to cut off said photosensitive member to sheets before being superposed on said image-receiving member.

3. An apparatus as defined in claim 2, further comprising means for connecting the leading end of said photosensitive member to a part of said image-receiving member in said superposing position.

4. An apparatus as defined in claim 1, wherein said image-receiving member is in the form of a roll, and means to cut off said image-receiving sheets before being superposed on said exposed photosensitive member.

5. An apparatus as defined in claim 1, wherein said processing liquid supplying belt is in the form of a roll and is withdrawn by a predetermined increment of length by means of a take-up roll to which said belt is fixedly attached.

6. An apparatus as defined in claim 1, wherein said breaking means comprises a support plate provided with holes through which the processing liquid from said broken bladders passes and a press plate adapted to press said belt against said support plate.

7. An apparatus as defined in claim 6, wherein said support plate is provided with needles around said holes for breaking through said bladders.

8. An instant photographic apparatus for use with a photosensitive member and an image-receiving member, comprising:

means for exposing said photosensitive member in order to create a latent image thereon;

means for separately advancing said exposed photosensitive member to a position superposed on an image-receiving member;

means within said apparatus for withdrawing a pod of processing liquid from a supply source comprising a plurality of said pods, and depositing said pod on said image-receiving member;

means for separately advancing said image-receiving member with said pod to said superposing position; and means for applying pressure to said superposed photosensitive and image-receiving members so as to rupture said pod held on the image-receiving member, thereby to distribute the processing liquid from said ruptured pod between said members.

9. An apparatus as defined in claim 8, wherein said pressure-applying means comprises a pair of rollers disposed with said members between them.

10. An apparatus as defined in claim 8, wherein said photosensitive member is in the form of a roll and is cut off to sheets by means of a cutter before being superposed on said image-receiving member.

11. An apparatus as defined in claim 8, further comprising means for connecting the leading end of said photosensitive member to a said image-receiving member in said superposing position.

12. An apparatus as defined in claim 8, wherein said image-receiving member is in the form of a roll and is cut off to sheets before being superposed on said exposed photosensitive member.

13. An apparatus as defined in claim 8, wherein said processing liquid pod supply source comprises a container for a plurality of said pods; and said withdrawing and depositing means comprises means for holding one of said pods in said container by suction and placing and releasing the same on said image-receiving member, and means which supports said holding means for movement between said container and the position in which said holding means places the pod on said image-receiving member.

14. An apparatus as defined in claim 13, and an expansible vertically swinging arm supporting said holding means.

15. An apparatus as defined in claim 13, wherein said pod of processing liquid is provided with an adhesive layer on one side opposite to the side which is held by said holding means by suction.

16. An apparatus as defined in claim 8, and means for applying adhesive on said image-receiving member at regular intervals for connecting said pod of processing liquid thereto.

17. An instant photographic apparatus in which a processing liquid is distributed between superposed exposed photosensitive and image-receiving members so as to produce on said image-receiving member a positive image corresponding to a latent image created on said exposed photosensitive member by means of diffusion transfer processing, said apparatus comprising means for separately advancing an exposed photographic member and an image-receiving member toward a superposing position, and means within said apparatus for withdrawing a pod of the processing liquid from a supply source comprising a plurality of said pods, and depositing said pod on the exposed photosensitive member or the image-receiving member before being superposed in contact with each other.

* * * * *